United States Patent [19]
Todaka et al.

[11] Patent Number: 5,807,588
[45] Date of Patent: Sep. 15, 1998

[54] EXTRUSION MOLDING APPARATUS AND AN APPARATUS FOR CONTROLLING THE SAME

[75] Inventors: Nobuhiko Todaka; Satoshi Yamaguchi, both of Toyota; Yoichi Hirai, Obu; Junji Arai, Chita; Kazunori Ueda, Nagoya; Kenichi Mitsuta, Toyota, all of Japan

[73] Assignees: Toyota Jidosha Kabushiki Kaisha; Tokai Kogyo Kabushiki Kaisha, both of Japan

[21] Appl. No.: 687,631

[22] Filed: Jul. 26, 1996

[30] Foreign Application Priority Data

Jul. 27, 1995  [JP]  Japan ................................. 7-192217

[51] Int. Cl.$^6$ ............................. B29C 47/02; B29C 47/92
[52] U.S. Cl. ........................... 425/113; 425/145; 425/149
[58] Field of Search .................................... 425/113, 140, 425/145, 149, 150; 264/252, 259

[56] References Cited

U.S. PATENT DOCUMENTS

| | | | |
|---|---|---|---|
| 4,234,372 | 11/1980 | Bernhard et al. | 156/356 |
| 5,362,428 | 11/1994 | Tsujino et al. | 425/113 |
| 5,382,395 | 1/1995 | Hoenke | 264/252 |
| 5,603,886 | 2/1997 | Ito et al. | 264/252 |
| 5,632,939 | 5/1997 | Ito et al. | 425/113 |

FOREIGN PATENT DOCUMENTS

| | | |
|---|---|---|
| 0524092 A1 | 1/1993 | European Pat. Off. . |
| 0672513 | 9/1995 | European Pat. Off. . |
| 4-261822 | 9/1992 | Japan . |
| 5-438 | 1/1993 | Japan . |
| 5-330334 | 12/1993 | Japan . |
| 6-8728 | 1/1994 | Japan . |

OTHER PUBLICATIONS

Patent Abstracts of Japan, vol. 18, No. 348, Publication No.: JP6087146, Mar. 29, 1994 (1 page).

*Primary Examiner*—James P. Mackey
*Attorney, Agent, or Firm*—Finnegan, Henderson, Farabow, Garrett, & Dunner, L.L.P.

[57] ABSTRACT

This invention aims to shorten cycle time by allowing a robot to be operated with speed capability regardless of the shape of moldings. An extrusion molding apparatus has an extrusion molding machine which delivers an extrusion material which becomes a frame-shaped molding through a nozzle fore end, and a robot which holds a workpiece on which the molding is formed and whose working speed is set so as to make travel speed of workpiece rectilinear portions with respect to the nozzle fore end higher than travel speed of workpiece corner portions with respect to the nozzle fore end. Thus, changes in workpiece travel speed with respect to the nozzle fore end are allowed, and robot working speed is not restricted by the shape of moldings.

4 Claims, 13 Drawing Sheets

(A)

(B)

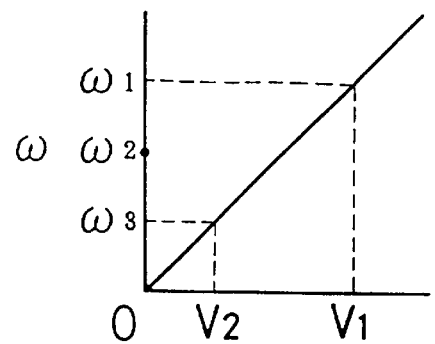
Fig. 14
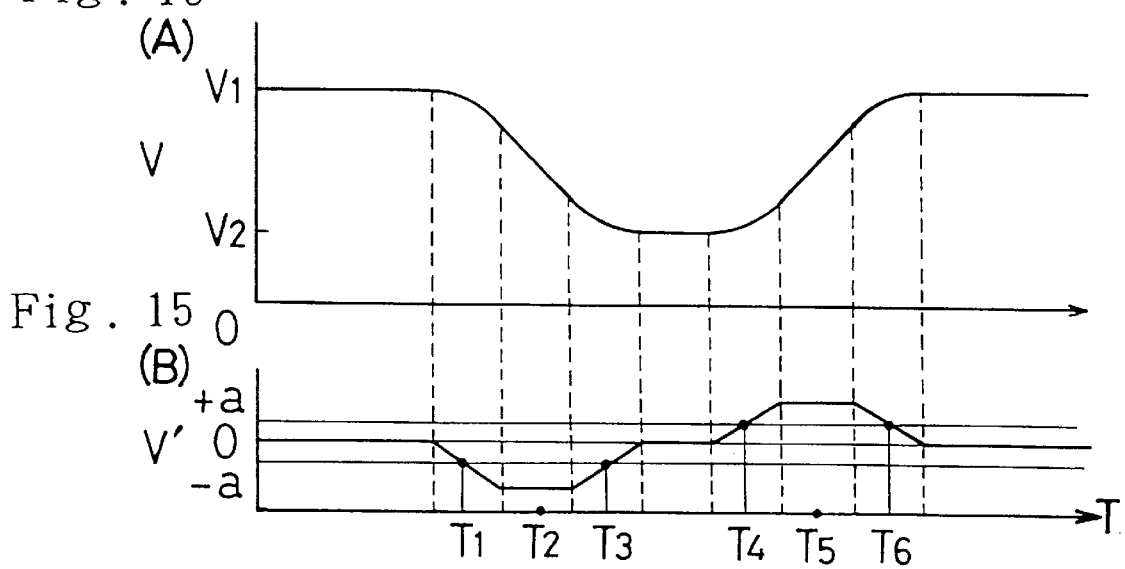
Fig. 15 (A)
Fig. 15 (B)
※ T2=(T1+T3)/2
T5=(T4+T6)/2
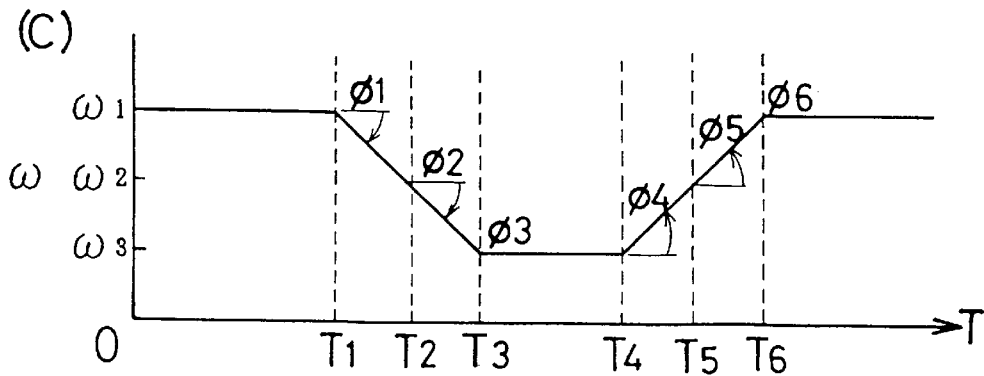
Fig. 15 (C)

(A)

(B)

(C)

(D)

EXTRUSION MOLDING APPARATUS AND AN APPARATUS FOR CONTROLLING THE SAME

BACKGROUND OF THE INVENTION

1. Field of the Invention

This invention relates to an extrusion molding apparatus for forming frame-shaped moldings integrally on the periphery of a panel such as an automobile windowpane, or producing moldings as independent component parts, and to a control apparatus of an extrusion molding apparatus which is capable of controlling the cross-sectional shape of moldings produced by the aforesaid extrusion molding apparatus with high precision.

2. Description of the Related Art

As is often the case, a frame-shaped molding 1 is integrally formed on the periphery of a panel such as an automobile windowpane, as shown in FIGS. 17(A) and 17(B). (Refer to Japanese Unexamined Patent Publication (KOKAI) No. 4-261822.) For formation of the above molding 1, employed is a cooperation system of an extrusion molding machine which discharges an extrusion material as a molding 1 from a nozzle fore end 4, and a robot which holds an automotive windowpane 2 (hereinafter referred to as a workpiece) and enables the workpiece 2 to make complex motion of rectilinear motion and rotary motion with respect to the above nozzle fore end 4. The extrusion molding machine delivers an extrusion material such as molten resin and discharge the material continuously from the nozzle fore end 4 by such a rotary actuator as a motor (hereinafter referred to as a molding machine actuator). The extrusion molding machine is located in such a manner that the peripheral portion of a workpiece making the above complex motion moves across the nozzle fore end 4. The nozzle fore end 4 is provided with a mouthpiece for rendering a cross sectional shape of the molding 1 to the extrusion material, as discussed later.

Therefore, when the robot is operated at a certain speed, a workpiece 2 is transferred with respect to the nozzle fore end 4, and such a molding 1 as shown in FIGS. 17(A) and 17(B) is integrally formed on the periphery of the workpiece. It will be appreciated that the peripheral portion of a workpiece is coated with primer 5, which will be formed into an adhesive layer by heat and pressure of the extrusion material.

In this type of extrusion molding, to obtain precise cross-sectional shape of moldings continuously, it is a fundamental technique to maintain a discharged amount of an extrusion material per unit time from the nozzle fore end constant, and workpiece travel speed, i.e., workpiece peripheral speed V constant.

In this case, in order to keep workpiece peripheral speed V constant, robot working speed $V_A$ at the time when workpiece peripheral speed at workpiece rectilinear portions is V is limited by robot working speed at the time when workpiece peripheral speed at workpiece corner portions is V. Consequently, there arises a drawback in which time for forming a molding on a workpiece (hereinafter referred to as cycle time) is lengthened.

In other words, in order to make peripheral speed V of workpiece corner portions equal to peripheral speed V of workpiece rectilinear portions, working speed $V_A$ of the robot in transferring the workpiece rectilinear portions must be lower than working speed $V_B$ of the robot in transferring the workpiece corner portions. As a result, cycle time is determined by workpiece peripheral travel distance (mm)/ travel speed of workpiece corner portions (mm/sec). This is longer than designed cycle time on the base of robot speed capability. Therefore, it is difficult to meet the demand for mass production fully.

In this regard, in order to reduce cycle time by decreasing time for tranferring rectilinear portions, it can be thought of to change peripheral speed V of workpiece rectilinear portions from that of workpiece corner portions, and at the same time, control working speed of an extrusion molding machine actuator (e.g., screw rotational speed) in such a manner that the discharged amount of an extrusion material is relatively changed to follow up changes in peripheral speed V.

The discharged amount of an extrusion material from the nozzle fore end, however, is a physical quantity which is dependent on the pressure of extruding an extrusion material by the molding machine actuator. A regression formula which expresses the relation between working speed of the molding machine actuator and the pressure of extruding an extrusion material from the nozzle fore end (hereinafter referred to simply as material extruding pressure) has a nonlinear difference factor and a time difference factor.

Therefore, when general feedback control based on proportional, integral, and derivative (PID) action is exercised to allow the material extruding pressure to follow up changes in working speed of the molding machine actuator, it takes a long time to set a regression formula and examine whether it is correct or not. Besides, since the above general control involves no steps of storing the above time difference factor and correcting data by the factor in advance, the delay in control becomes so remarkable that precise cross-sectional shape of moldings cannot be maintained.

In addition, the material extruding pressure is liable to have a gap with a target value because of disturbance such as outside air temperature, and this makes automatic control in continuous production difficult.

SUMMARY OF THE INVENTION

The present invention has been conceived to overcome the above problems.

It is an object of the present invention to reduce cycle time by allowing a robot to be operated with speed capability regardless of the shape of moldings.

It is a further object of the present invention to reduce variations in the cross-sectional shape of moldings even when workpiece travel speed changes, and at the same time facilitate preparatory work before molding such as setting of a regression formula.

To achieve the foregoing objects, the present invention has allowed workpiece travel speed with respect to a nozzle fore end to be changed so that robot working speed is not restricted by the shape of moldings.

An extrusion molding apparatus according to a first aspect of the present invention comprises an extrusion molding machine having a molding machine actuator which delivers an extrusion material which becomes a frame-shaped molding through a nozzle fore end, and a robot which holds a workpiece on which the molding is formed while having the workpiece make complex motion of rectilinear motion and rotary motion, and whose working speed is set so as to make travel speed of workpiece rectilinear portions with respect to the nozzle fore end higher than travel speed of workpiece corner portions with respect to the nozzle fore end which is restricted by the distance between the corner portions of the above molding and the center of the rotary motion.

According to a second aspect of the present invention, a control apparatus which controls the actuator of the aforementioned extrusion molding machine comprises speed data input means, difference factor calculating means, and operating means, and is realized mainly by a controller with a general CPU. The speed data input means is constituted by RAM or a register accessed by the CPU. The difference factor calculating means is composed of ROM or RAM on which it is possible to write one regression formula expressing the relation of any two of the workpiece travel speed, material extruding pressure at the nozzle fore end, and working speed of the molding machine actuator, and ALU which calculates at least one of a nonlinear difference factor and a time difference factor between material extruding pressure and working speed of the above molding machine actuator on the base of the workpiece travel speed, in cooperation with the ROM or RAM. The operating means includes an electric power output circuit for driving the above molding machine actuator, and can be constituted by an electric circuit which generates control signals to output driving signals to the molding machine actuator, and supplies those signals to the electric power output circuit.

According to the third aspect of the present invention, the control apparatus uses a regression formula expressing the relation between the workpiece travel speed and material extrusion pressure at the above nozzle fore end. The control apparatus is provided with pressure detecting means for detecting material extruding pressure at the nozzle fore end, and calculates difference, as a nonlinear difference factor, between pressure detected by the pressure detecting means and material extruding pressure calculated by using the regression formula.

According to a fourth aspect of the present invention, the control apparatus produces time series points when workpiece travel speed changes, and working speed instruction values (basic data) for the molding machine actuator which are required at the respective time series points, by the basic data production means. In addition, the control apparatus reads the waveform of workpiece travel speed for one cycle, and calculates a time difference factor between material extruding pressure and working speed of the above molding machine actuator at each of the above time series points, on the base of workpiece speed change rate obtained by differentiating the waveform of workpiece travel speed, and the workpiece travel speed. Then, on the base of the above time difference factor, the control apparatus shifts the basic data along the time axis in advance of each of the time series points when the workpiece travel speed changes.

According to a fifth aspect of the present invention also concerns a control apparatus for controlling the actuator of the above extrusion molding machine. This control apparatus reads workpiece travel speed for one cycle beforehand, sets basic data at the time series points when the change rate of this workpiece travel speed varies. Then, during the extrusion molding based on the above basic data, the control apparatus calculates time difference between the time series points when pressure change rate obtained from the waveform of detected pressure for one cycle, and the time series points based on the above workpiece travel speed, corrects the above basic data by the time difference and switches them with corrected data in sequence.

The nonlinear difference factor is difference between the characteristic of variations in workpiece travel speed and the characteristic of variations in material extruding pressure.

It should be noted that the present invention according to the second to fifth aspects of the invention can be carried out, for example, by displaying a graph which indicates points of change in workpiece travel speed on a screen, and achieving molding with manual operation for changing working speed of the molding machine actuator before these points of change.

Now, the operation of the present invention is as follows.

According to the first aspect of the present invention, in the case where a molding is formed on the periphery of a workpiece, even when the workpiece travel speed, i.e., workpiece peripheral speed is lowered at corner portions, there is no need to reduce the workpiece peripheral speed at rectilinear portions in conformity with that low speed. The robot can be operated with speed capability.

According to the second aspect of the present invention, the control apparatus reads workpiece peripheral speed before molding, and calculates a nonlinear difference factor or a time difference factor between the waveform of workpiece peripheral speed and the waveform of material extruding pressure. Then, on the base of this difference factor, the control apparatus corrects control signals for instructing working speed of the molding machine actuator in advance of changes in workpiece peripheral speed.

According to the third aspect of the present invention, since the control apparatus reads workpiece peripheral speed before molding, and calculates a nonlinear difference factor between the waveform of workpiece travel speed and the waveform of material extruding pressure, it is possible to prevent variations in cross-sectional shape attributed to the nonlinear difference factor.

According to the fourth aspect of the present invention, the control apparatus sets basic data for instructing working speed of the molding machine actuator at time series points when workpiece travel speed changes. Then, the control apparatus calculates a time difference factor between material extruding pressure and working speed of the molding machine actuator at the above time series points, on the base of workpiece travel speed, and workpiece speed change rate obtained by differentiating the workpiece travel speed. On the base of the obtained time difference factor, the control apparatus shifts the above basic data along the time axis in advance of the above time series points when the above workpiece travel speed changes, and outputs corrected basic data to the operating means. Thus, the control apparatus can attain control in which changes in workpiece travel speed are read beforehand and material extruding pressure is controlled to follow up the changes in workpiece travel speed.

According to the fifth aspect of the present invention, the control apparatus calculates time difference between the time series points when workpiece peripheral speed changes and the time series points when material extruding pressure changes in every cycle. Based on the time difference, the control apparatus calculates advanced time series points for outputting control signals for instructing working speed of the molding machine actuator with respect to the time series points when workpiece peripheral speed changes. Besides, the control apparatus corrects the former control signals to control signals which are necessary at the advanced time series points.

Now, advantages of the present invention will be discussed.

According to the first aspect of the present invention, even when workpiece travel speed is lowered at the corner portions, there is no need to lower workpiece travel speed at the rectilinear portions in conformity with that low speed.

Thus, the robot can be operated with speed capability, and cycle time can be reduced considerably.

According to the second aspect of the present invention, working speed of the molding machine actuator can be controlled so that material extruding pressure always follows up workpiece travel speed. Therefore, even when workpiece travel speed at the corner portions is different from workpiece travel speed at the rectilinear portions, an effect of suppressing variations in cross-sectional shape by the essential technique can be maintained.

In addition, because the regression formula used herein is a simple linear expression, a coefficient can be easily set with a slight modification in view of disturbance.

According to the third aspect of the present invention, it is possible to prevent variations in cross-sectional shape attributed to a nonlinear difference factor between the waveform of workpiece travel speed and the waveform of material extruding pressure.

According to the fourth aspect of the present invention, it is possible to prevent variations in cross-sectional shape attributed to a time difference factor between material extruding pressure and working speed of the molding machine actuator.

According to the fifth aspect of the present invention, control signals for the molding machine actuator can be corrected in every cycle of molding. Therefore, variations in the cross-sectional shape of moldings can be reduced even when there are disturbance such as changes in temperature environment, and variation in resin material characteristic values.

BRIEF DESCRIPTION OF THE DRAWINGS

The exact nature of this invention, as well as other objects and advantages thereof, will be readily apparent from consideration of the following specification relating to the annexed drawings in which:

FIG. 3(A) shows workpiece rectilinear motion and FIG. 3(B) shows workpiece movements at a corner portion;

FIG. 10(A) shows the waveform of workpiece travel speed, FIG. 10(B) shows the waveform of material extruding pressure.

FIG. 14 is a graph showing a regression formula set in the third preferred embodiment of the present invention;

FIGS. 15(A), 15(B), and 15(C) are time charts for explaining programs carried out by the control apparatus of the third preferred embodiment of the present invention, and FIG. 15(A) shows the waveform of workpiece travel speed, FIG. 15(B) shows the waveform of workpiece speed change rate obtained by differentiating the waveform of the workpiece travel speed, and FIG. 15(C) shows the waveform of basic data;

FIG. 16(A) shows the waveform of detected pressure, FIG. 16(B) shows the waveform of pressure change rate obtained by differentiating the waveform of the detected pressure, and FIG. 16(C) shows a time chart showing the relation between the time series points about workpiece travel speed and the time series points about detected pressure, and FIG. 16(D) shows the waveform of corrected basic data;

DETAILED DESCRIPTION OF THE PREFERRED EMBODIMENTS

Now, the present invention will be discussed in detail by way of preferred embodiments.

Basic Construction

Figure 1:
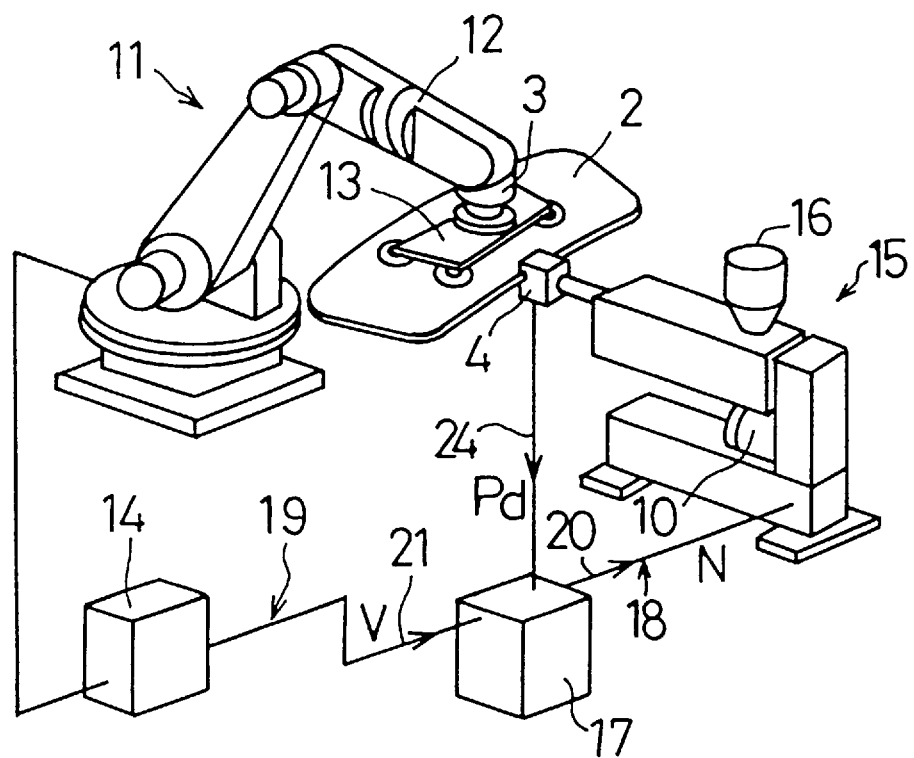
FIG. 1 is a perspective view of an extrusion molding apparatus according to the present invention.

FIG. 1 shows an extrusion molding apparatus according to the present invention.

Figure 3:
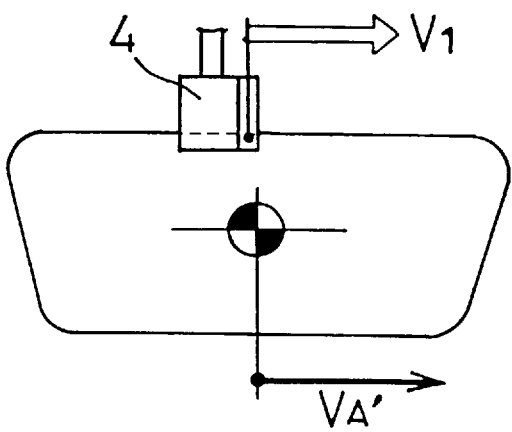
FIGS. 3(A) and 3(B) are drawings for explaining workpiece movements according to the present invention.
Figure 3:
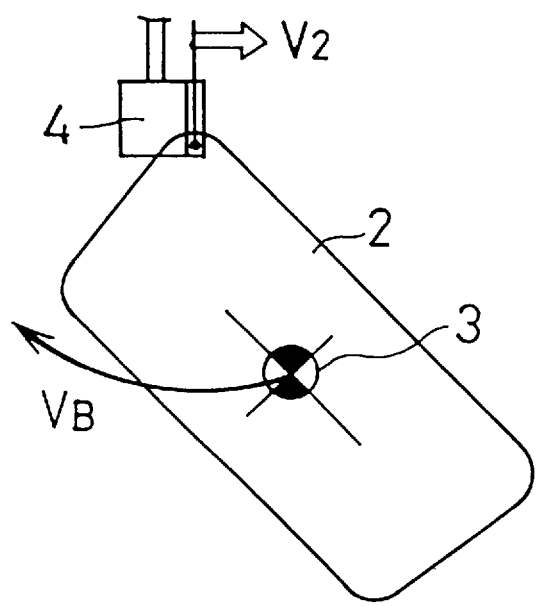

In FIG. 1, a robot 11 has an arm 12 which has a wide freedom and whose operation is instructed by a robot control panel 14. An attachment 13 for holding a workpiece 2 is fixed to a fore end of the arm 12. The workpiece 2 is held by the attachment 13 in such a way that a holding center 3 makes complex motion of rectilinear motion and rotary motion, as shown in FIGS. 3(A) and 3(B).

An extrusion molding machine 15 has a construction in which an extrusion material which has been supplied to a hopper 16 is delivered to a nozzle fore end 4 and discharged from the nozzle fore end 4 by a motor 10, and to the motor 10 control signals 20 are supplied from a molding machine control panel 17 by way of communication cable 18. These control signals 20 are to instruct rotational speed N of the motor 10 according to the present invention.

On the other hand, speed instruction signals 21 for instructing workpiece travel speed, i.e., workpiece peripheral speed V is transferred from the aforementioned robot control panel 14 to the molding machine control panel 17 by way of communication cable 19.

Figure 2:
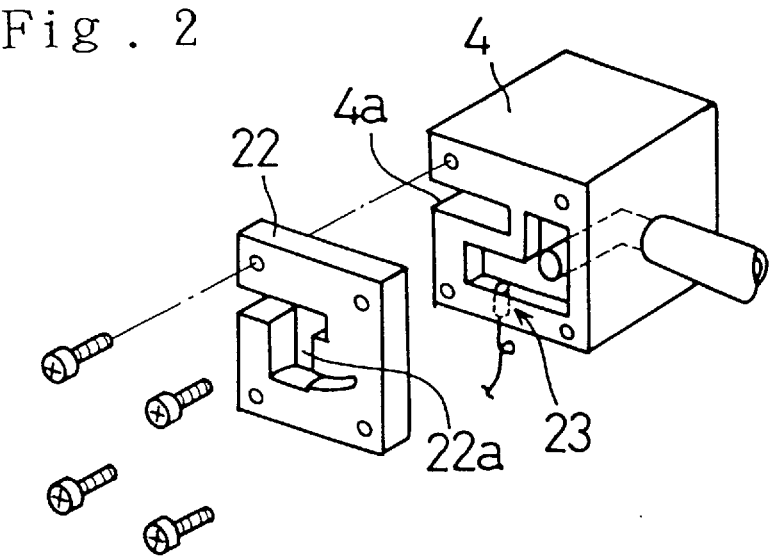
FIG. 2 is an exploded view of a nozzle fore end of an extrusion molding machine according to the present invention.

As shown in FIG. 2, the nozzle fore end 4 has a slit 4a which is to be engaged with a peripheral portion of a workpiece 2. A mouthpiece 22 having a discharge port 22a which communicates with the slit 4a is attached to the nozzle fore end 4. The discharge port 22a restricts the cross-sectional shape of an extrusion material.

In first and third preferred embodiments as mentioned later, a pressure sensor 23 is provided at the nozzle fore end 4 to achieve control with detection of material extruding pressure at the discharge port 22a. In these preferred embodiments, pressure data $P_d$ detected by the pressure sensor 23 are transferred to the molding machine control panel 17 by way of communication cable 24.

The pressure sensor 23 may be installed, for example, by providing a semiconductor film for detecting mechanical distortion, on the nozzle fore end 4 directly, or by dividing a constant pressure chamber with such a semiconductor film.

Figure 18:
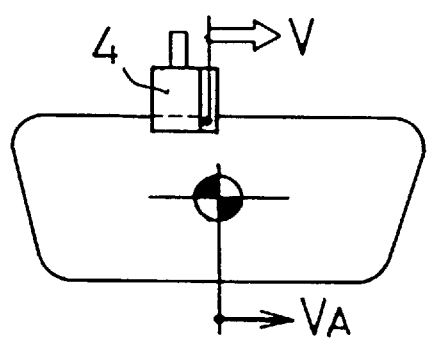
FIGS. 18(A) and 18(B) are drawings for explaining workpiece movements in a conventional extrusion molding apparatus.
Figure 18:
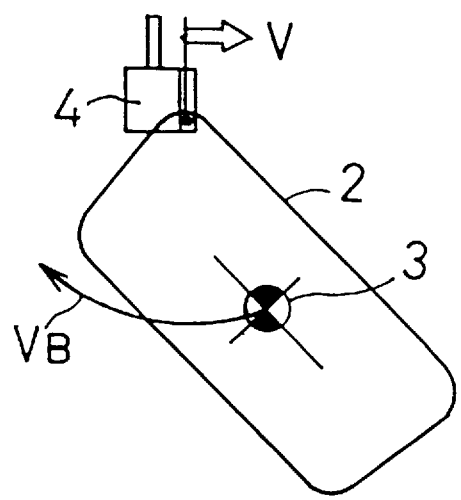

The feature of the above extrusion molding apparatus resides in that the entire periphery of a workpiece is not transferred at constant speed which is restricted by the workpiece peripheral speed at the workpiece corner portions, and in that robot working speed is controlled so that the workpiece peripheral speed at workpiece rectilinear portions alone attains a high speed. In other words, in contrast to the prior art shown in FIGS. 18(A) and 18(B), robot working speed $V_A$ in molding rectilinear portions which do not require a decrease in speed is not restricted by robot working speed $V_B$ in molding corner portions which require a decrease in workpiece travel speed in accordance with the distance between the holding center 3 and the corner portions, so as to inhibit constant workpiece peripheral speed on the entire periphery of the workpiece. As apparent from a comparison of FIG. 3(A) with FIG. 18(A), robot working speed $V_A'$ in molding workpiece rectilinear portions is set to satisfy $V_A'>V_A$, in order that $V_1>V_2$.

Figure 4:
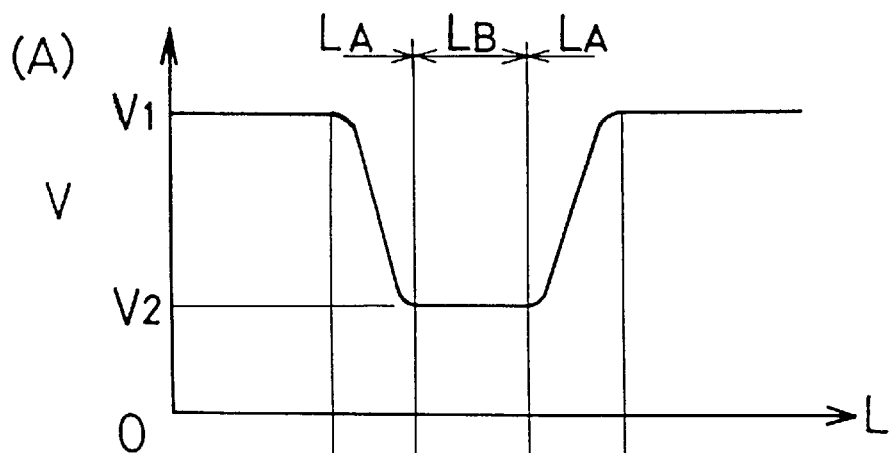
FIG. 4(A) shows the waveform of workpiece travel speed.
FIG. 4(B) shows the waveform of material extruding pressure, with regard to the extrusion molding machine according to the present invention.
Figure 4:
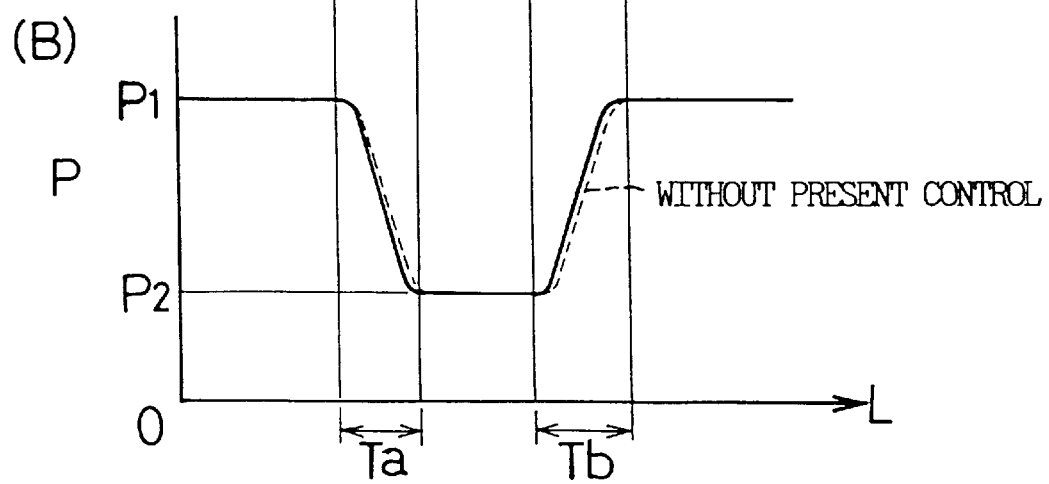

Therefore, as shown in FIG. 4(A), a workpiece 2 travels at a high speed $V_1$ in rectilinear travel sections $L_A$ with respect to the nozzle fore end 4, and at a low speed $V_2$ in corner travel sections $L_B$.

In order to adopt the aforementioned fundamental technique to a workpiece which is traveled at a higher workpiece peripheral speed in rectilinear sections as mentioned above, the present invention needs to control a discharging amount (flow rate) of an extrusion material in response to variations in workpiece peripheral travel speed such as $V_1–V_2–V_1$ . . . Following preferred embodiments will offer some systems for controlling this.

First Preferred Embodiment of a Control Apparatus

Figure 5:
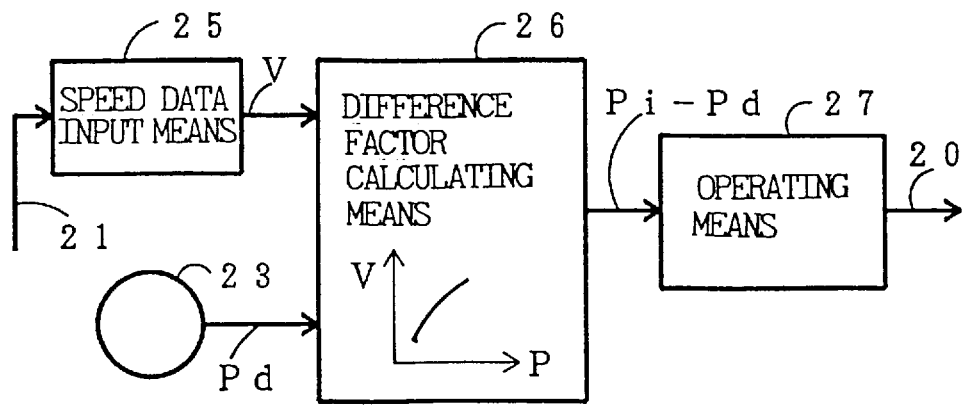
FIG. 5 is a block diagram of a control apparatus of an extrusion molding apparatus of a first preferred embodiment of the present invention.

In a first preferred embodiment of the present invention, in addition to the above basic construction, the molding machine control panel 17 constituting a control apparatus of the extrusion molding apparatus according to the present invention has following construction as shown in a block diagram of FIG. 5.

The molding machine control panel 17 has speed data input means 25, difference factor calculating means 26, and operating means 27. The speed data input means 25 is to read speed instruction signals 21 for instructing the above workpiece peripheral speed V, before molding.

The difference factor calculating means 26 is to input detected pressure $P_d$ from the above pressure sensor 23, calculate material extruding pressure $P_i$ which is necessary at the above nozzle fore end 4 at each value of workpiece peripheral speed V read by the above speed data input means 25 by using a regression formula expressing the relation between the above workpiece peripheral speed V and the above material extruding pressure P, and obtain a nonlinear difference factor between the above material extruding pressure P, and rotational speed N of the above motor 10 on the base of the workpiece peripheral speed V stored in the above speed data input means 25, by comparing the calculated material extruding pressure $P_i$ and the above detected pressure $P_d$.

The operating means 27 is to generate control signals 20 for controlling rotational speed N of the above motor 10 so that material extruding pressure P at the above nozzle fore end 4 follows up changes in the above workpiece peripheral speed V with the above nonlinear difference factor taken as a parameter.

Next, the operation of the above construction will be described with reference to FIGS. 4 to 7.

As mentioned before, the workpiece 2 is traveled with respect to the nozzle fore end 4 at a high speed $V_1$ in the rectilinear travel sections $L_A$, and at a low speed $V_2$ in the corner travel sections $L_B$. FIG. 4(A) shows the waveform of workpiece peripheral speed V in which workpiece peripheral speed V at the rectilinear portions is different from workpiece peripheral speed V at the corner portions. This waveform of workpiece peripheral speed V is produced, for example, by using signals supplied from a speed sensor provided on a certain workpiece peripheral portion, or signals calculated from robot working speed $V_A'$, $V_B$.

Upon actuation of a start switch, the molding machine control panel 17 executes Step $S_1$ for registering, in a certain memory, a regression formula: V=f[P] which expresses the relation between workpiece peripheral speed V and material extruding pressure P and which is used in the processing of the difference factor calculating means 26. Concurrently with this, the robot control panel 14 executes Step $S_a$ for setting a robot program in accordance with the shape of a workpiece (for example, working speed instruction $v_B$ at the corner portions and $v_A'$ at the rectilinear portions, motion type instruction, etc.).

Figure 6:
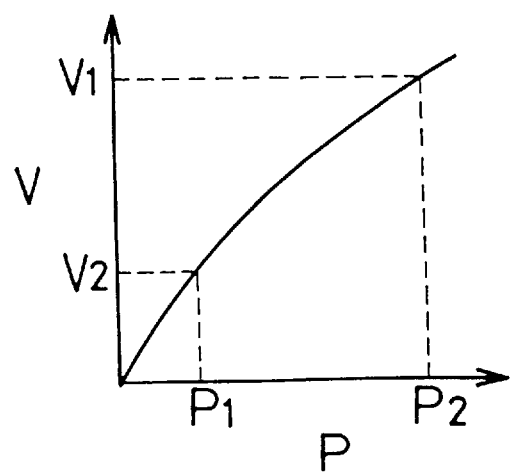
FIG. 6 is a graph showing a regression formula used in the first preferred embodiment of the present invention.
Figure 7:
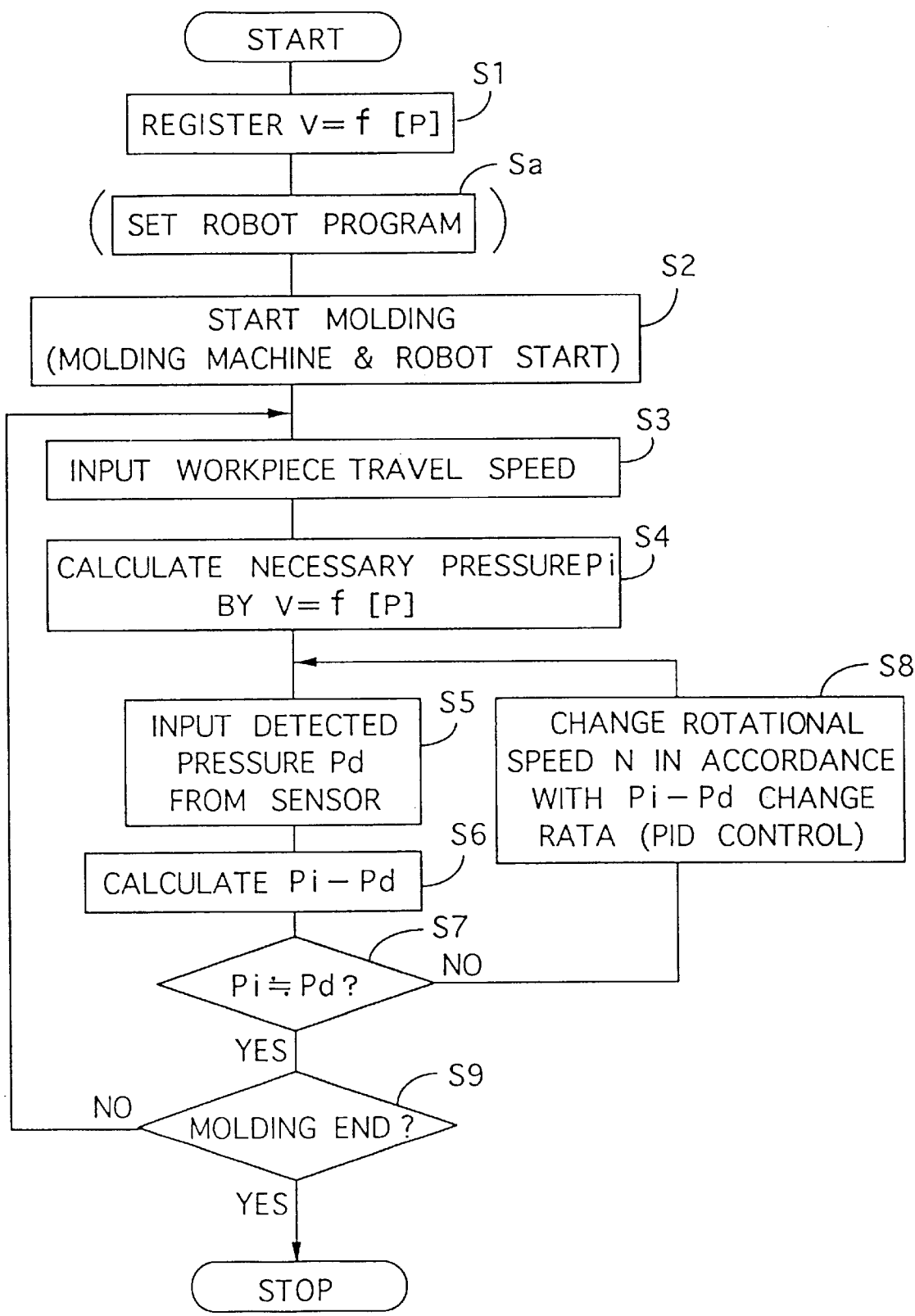
FIG. 7 is a flow chart showing programs carried out by the control apparatus of the first preferred embodiment of the present invention.

The regression formula: V=f [P] has been obtained by conducting an experiment to obtain the relation of workpiece peripheral speed V and material extruding pressure P at the time when the cross sectional shape of an extrusion material is maintained, and by specifying a function which is most approximate to this characteristic by trial and error. The obtained regression formula: V=f [P] is expressed by almost straight line, as shown in FIG. 6. Therefore, the variation waveform of workpiece peripheral speed V and the variation waveform of material extruding pressure P attain approximately similar figures in the case of ideal molding, as apparent from a comparison of the solid-line waveforms in FIGS. 4(A) and 4(B).

After the above preparatory processing, the molding machine control panel 17 and the robot control panel 14 start molding operation in Step $S_2$. When Step $S_2$ is carried out, the robot 11 holds a workpiece 2 by the arm 12 and allows a certain peripheral portion of the workpiece 2 to be engaged with the slit 4a of the nozzle fore end 4 of the extrusion molding machine 15, whereby the robot 11 is ready to transfer the workpiece 2. On the other hand, the extrusion molding machine 15 is ready to discharge an extrusion material supplied in the hopper 16 from the nozzle fore end 4.

If the molding position immediately after molding starts lies in a rectilinear portion of the workpiece 2, in Step $S_3$ a speed instruction signal 21 from the robot control panel 14 is for instructing a high speed $V_1$ and read by a certain register which constitutes speed data input means 25. It is important that the speed instruction signal 21 for instructing the high speed $V_1$ is read before the workpiece 2 is transferred (i.e., before molding starts). It is desirable that the timing for advance reading is at least one program step before molding starts.

In Step $S_4$, the molding machine control panel 17 executes calculation by the difference factor calculating means 26 by using the registered regression formula: V=f[P] to obtain a calculated material extruding pressure $P_i$, The calculated material extruding pressure $P_i$ is necessary material extruding pressure at the workpiece peripheral speed $V_1$.

Then, the molding machine control panel 17 executes a loop of Step $S_5$-Step $S_6$-Step $S_7$-Step $S_8$-Step $S_5$ by the operating means 27: the molding machine control panel 17 inputs the detected pressure $P_d$ from the material extruding pressure sensor 23 in Step $S_5$, calculates difference $(P_i-P_d)$ between the calculated material extruding pressure $P_i$ and the detected pressure $P_d$. determines the calculation result in Step $S_7$, and when the difference $(P_i-P_d)$ is a certain finite value (NO), the molding machine control panel 17 goes to Step $S_8$ to generate a control signal for instructing rotational speed N of the motor 10 which permits the material extruding pressure P at the nozzle fore end 4 to follow up a change in the workpiece peripheral speed V. The operation of the operating means 27 in Step $S_8$ is general PID control.

The operating means 27 which exercises the above PID control repeats the above loop until the difference $(P_i-P_d)$ converges on approximately zero. During this, the rotational speed N of the motor 10 is controlled and the material extruding pressure at the nozzle fore end 4 becomes equal to the material extruding pressure determined by the regression formula, so that the extrusion material is discharged under the material extruding pressure $P_i$ which is necessary at the workpiece peripheral speed $V_1$.

When the difference $(P_i-P_d)$ is approximately zero, whether one cycle terminates or not is determined in Step $S_9$. In the middle of molding, the molding machine control panel 17 goes back to Step $S_3$ to read a speed instruction signal 21, and repeats the processing in and after Step $S_4$ to calculate necessary pressure $P_i$. That is to say, the molding machine control panel 17 exercises control for following up a command workpiece travel speed $V_2$ in transferring from the rectilinear portion to a corner portion and control in transferring from the corner portion to a rectilinear portion in a similar way.

In summary, in the above first preferred embodiment, the workpiece peripheral speed V at rectilinear portions attains a higher speed $V_1$ than speed $V_2$ at corner portions. Accordingly, the robot can be operated with speed capability throughout the periphery of a workpiece, and thereby cycle time can be reduced.

In addition, the molding machine control panel 17 of the first preferred embodiment recognizes a change in workpiece peripheral speed V before molding, calculates material extruding pressure after the change beforehand, and carries out advance control of the motor 10. Consequently, the nonlinear difference factor shown in the waveform of material extruding pressure (the dotted line waveform in FIG. 4(B) ) is compensated, so that the respective characteristics of the workpiece peripheral speed V in a period $T_a$ when it changes from the high speed $V_1$ to the low speed $V_2$, and in a period $T_b$ when it changes from the low speed $V_2$ to the high speed $V_1$ can be approximately in conformity with the respective characteristics of material extruding pressure P changing from the high pressure $P_1$ to the low pressure $P_2$ and changing from the low pressure $P_2$ to the high pressure $P_1$, Thus, the first embodiment can achieve molding with keeping the cross-sectional shape of moldings continuously.

Besides, because the regression formula: V=f[P] can be a simple linear expression, a coefficient can be most easily set with a slight modification in view of disturbance.

Second Preferred Embodiment of the Control Apparatus

A second preferred embodiment of the present invention will be discussed with reference to FIGS. 8 to 11.

Figure 8:
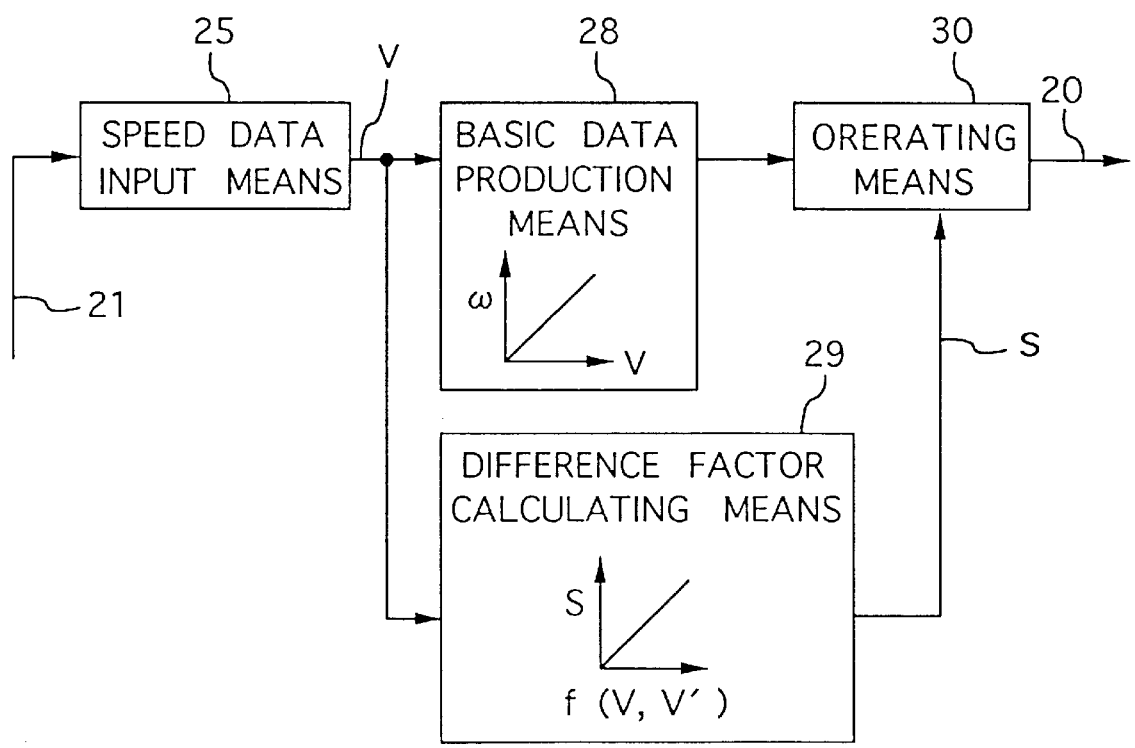
FIG. 8 is a block diagram of a control apparatus of an extrusion molding apparatus of a second preferred embodiment of the present invention.

As shown in FIG. 8, a control apparatus of the second preferred embodiment comprises speed data input means 25, basic data production means 28, difference factor calculating means 29, and operating means 30. The speed data input means 25 is to read peripheral speed of a workpiece 2 with respect to the nozzle fore end 4 for one cycle, before molding. The basic data production means 28 is to produce basic data for giving necessary rotational speed to the motor 10, from the travel speed stored in the speed data input means 25. The difference factor calculating means 29 is to calculate a regression formula of a time difference factor between changes in rotational speed of the above motor 10 and changes in material extruding pressure, on the base of the travel speed data read by the above speed data input means 25. The operating means 30 is to correct the basic data produced by the above basic data production means 28 along the time axis by the time difference calculated from the above regression formula to produce final control signals.

Figure 9:
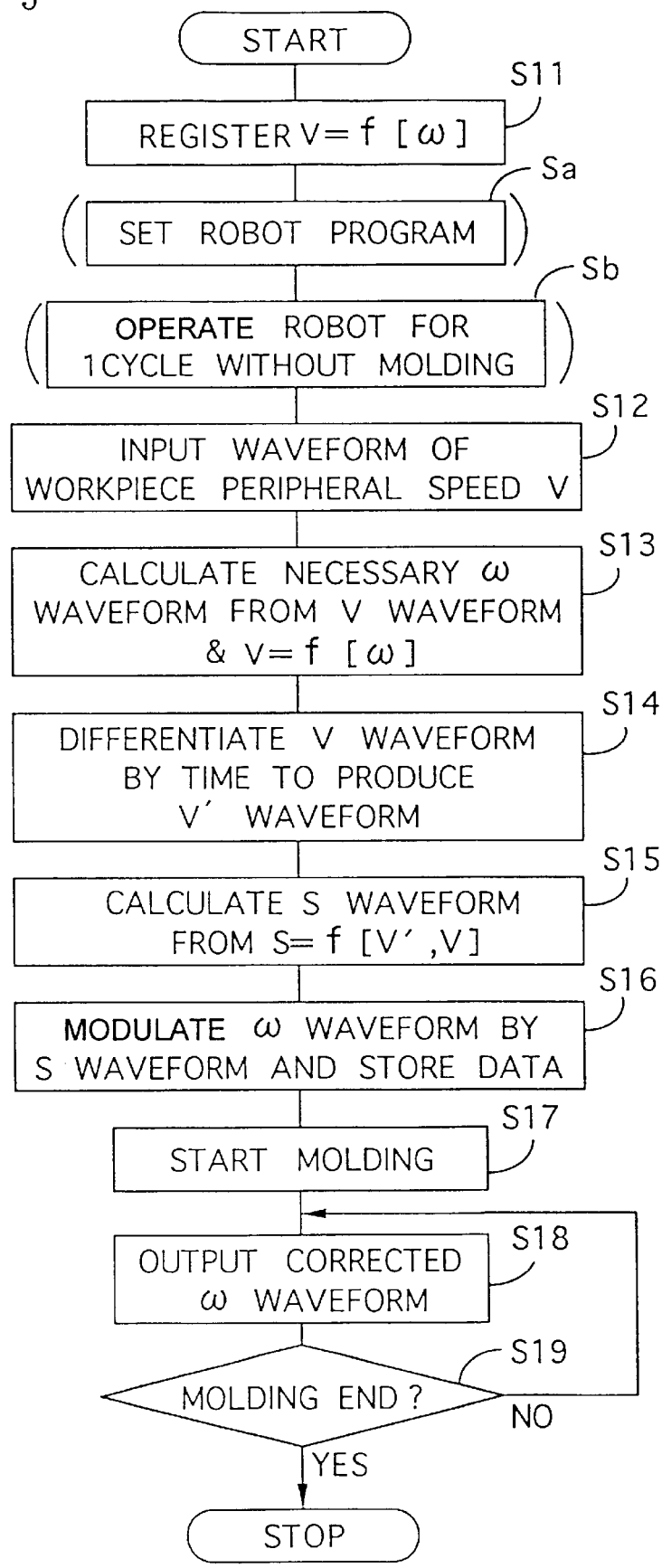
FIG. 9 is a flow chart showing the programs carried out by the control apparatus of the second preferred embodiment of the present invention.
Figure 10:
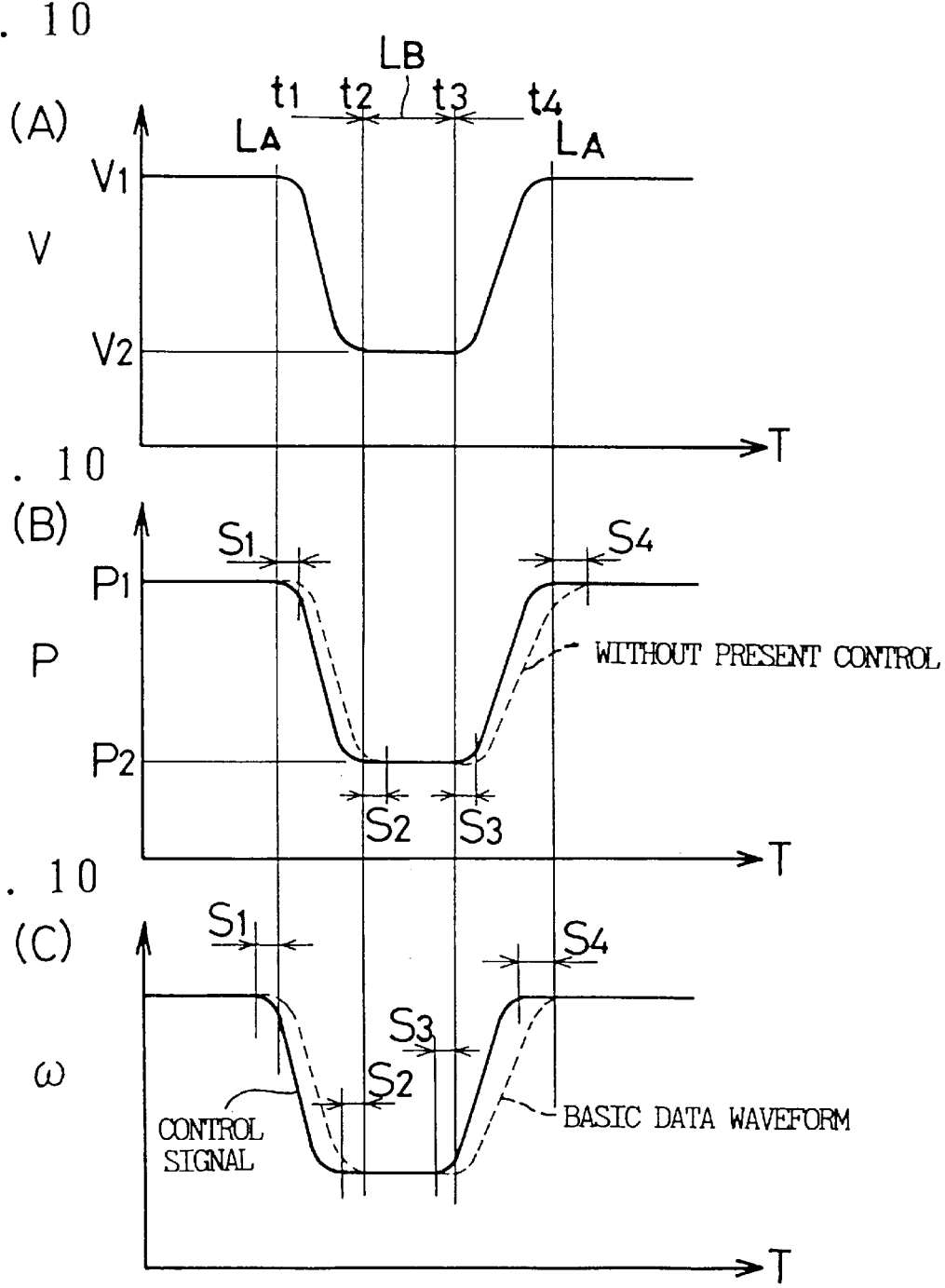
FIGS. 10(A), 10(B) and 10(B) are time charts for the control apparatus of the second preferred embodiment of the present invention.
FIG. 10(C) shows the waveform of control signals for the molding machine actuator.

The operation of the control apparatus of the second preferred embodiment is shown in FIG. 9.

In FIG. 9, Step $S_{11}$ to Step $S_{16}$ are preparatory processing before molding. Step $S_{11}$ is to register a regression formula: V=f[ω] expressing the relation between workpiece travel speed and rotational speed, i.e., angular velocity of the motor 10. The regression formula is stored in a certain memory which is accessed by the basic data production means 28.

Steps $S_a$ and $S_b$ are carried out by the robot control panel 14. It must be noted that in Step $S_b$ the robot control panel 17 operates the robot for one cycle while making the robot holding a workpiece 2. Accordingly, in the following Step $S_{12}$ a certain register reads the workpiece peripheral speed for one cycle before molding, thereby serving as the speed data input means 25.

In this case, the workpiece peripheral speed V is stored as waveform data shown in FIG. 10(A).

In Step $S_{13}$, the molding machine control panel 17 calculates respective angular velocities ω of the motor 10 which are required at time series points $t_1$ to $t_4$ about the workpiece peripheral speed V by using the regression formula V=f[ω] registered in Step $S_{11}$, thereby serving as basic data production means 28. The respective angular velocities ω are basic data on which control signals are based, and stored as a waveform which indicates continuous angular velocity variation. This basic data waveform is shown by a broken line in FIG. 10(C).

In Step $S_{14}$, the waveform data of workpiece peripheral speed V read in Step $S_{12}$ are differentiated, so as to obtain workpiece speed change rates V' at the respective time series points $t_1$ to $t_4$.

In Step $S_{15}$, the molding machine control panel 17 calculates a regression formula S=[V', V] expressing time difference s between changes in rotational speed of the above motor 10 and changes in material extruding pressure, with the workpiece peripheral speeds V and the workpiece speed change rates at the above respective time series points $t_1$ to $t_4$ taken as parameters, so as to obtain the variation waveform (not shown) of time difference s at the respective time series points $t_1$ to $t_4$, thereby serving as difference factor calculating means 29.

Figure 11:
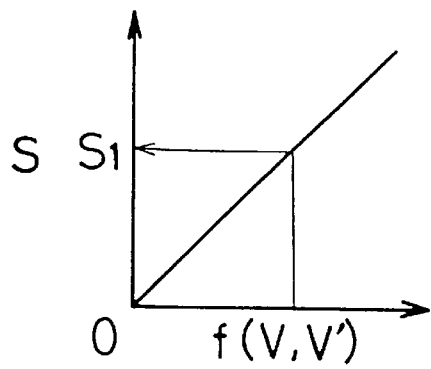
FIG. 11 is a graph showing a regression formula set in the second preferred embodiment.

This variation waveform of time difference s is calculated from the values of f[V', V], as shown in FIG. 11. f[V', V] is expressed by a polynomial of V/V'. That is to say, each term (which will be a time factor) obtained by dividing each workpiece peripheral speed $V_1$ in the neighborhood of, for example, a time series point $t_1$ by each workpiece speed change rate $V_1'$ at each time is totaled.

The neighborhood of a time series point $t_1$ is a period until the workpiece speed change rate $V_1'$ becomes constant. The respective time factors $s_1$, $s_2$, etc. thus calculated express time constant in the initial stage and in the final stage of a period when workpiece peripheral speed changes from one value to another value.

The molding machine control panel 17 applies this time constant to changes in material extruding pressure, and at the same time converts angular velocity of the motor 10 into time required for advance control.

In other words, when it is defined that the relation between workpiece travel speed and angular velocity of the motor 10 is linear, and that material extruding pressure must follow up workpiece travel speed, it is supposed that the time lag s from a change in angular velocity of the motor 10 to a change in material extruding pressure is in proportion to the time constant required for workpiece travel speed to change.

In the following Step $S_{16}$ the waveform data of angular velocity ω calculated in Step $S_{13}$ are modulated by the characteristics of changes in the above difference factor S. That is to say, the waveform data are displaced along the time axis by the difference factor S at each of the time series points $t_1$ to $t_4$ when workpiece peripheral speed changes.

As a result, the basic data are corrected as indicated by the solid-line waveform in FIG. 10(C). The molding machine control panel 17 uses these corrected data as control signals for angular velocity of the motor 10 in the following molding processes, thereby serving as operating means 3.

After the above preparatory processing about one workpiece is finished, the molding machine control panel 17 goes to molding processing after Step $S_{17}$ for the start of molding and repeats this molding processing hereinafter. That is to say, in Step $S_{18}$, the molding machine control panel 17 outputs the control signals obtained in Step $S_{16}$ for each workpiece and drives the motor 10, and in Step $S_{19}$ determines whether the molding of one workpiece is finished or not.

The control apparatus of the second preferred embodiment reads workpiece peripheral speed for one cycle, and when there is such a large time difference between the change in rotational speed of the motor 10 and the change in material extruding pressure as to prevent the cross-sectional shape of moldings from being maintained, the control apparatus can produce control signals for compensating rotational speed in advance of this time difference.

The Third Preferred Embodiment of the Control Apparatus

A third preferred embodiment of the present invention will be discussed with reference to FIGS. 12 to 16.

Figure 12:
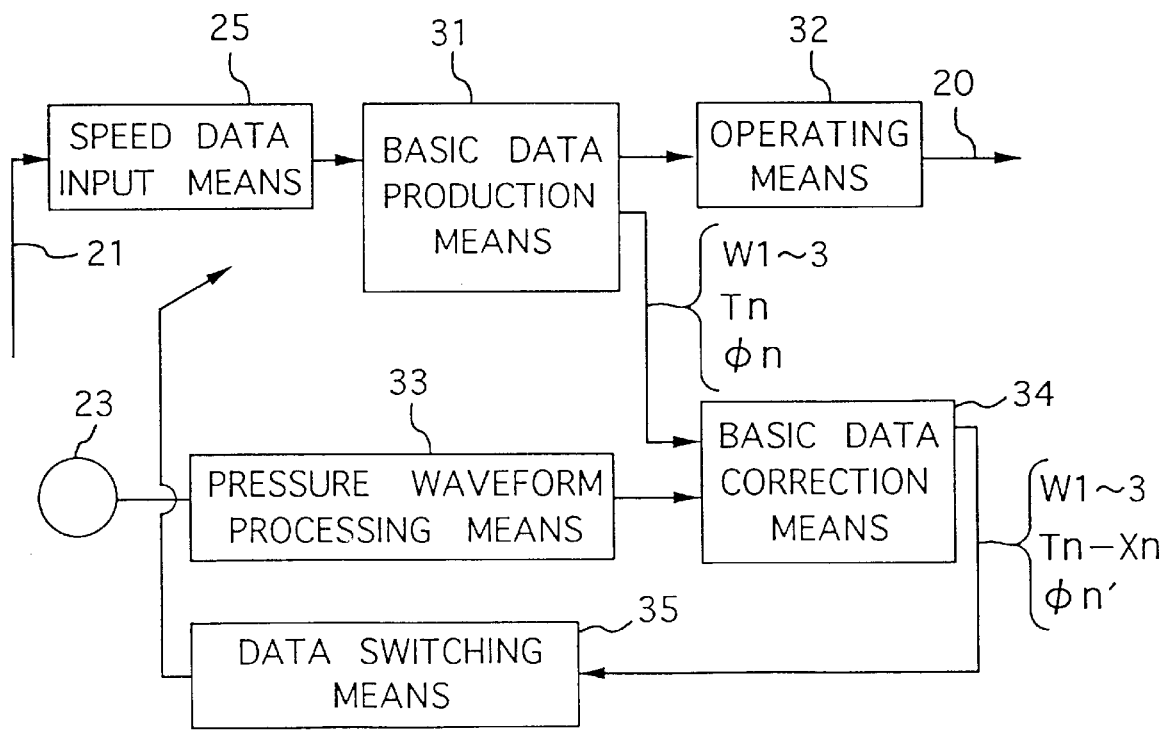
FIG. 12 is a block diagram of a control apparatus of a third preferred embodiment of the present invention.

As shown in FIG. 12, the control apparatus of the third preferred embodiment comprises a pressure sensor 23, speed data input means 25, basic data production means 31, operating means 32, pressure waveform processing means 33, basic data correction means 34, and data switching means 35. The pressure sensor 23 is provided to detect material extruding pressure at the nozzle fore end 4. The speed data input means 25 is to read beforehand travel speed of a workpiece for one cycle with respect to the nozzle fore end 4. The basic data production means 31 is to obtain basic data from the travel speed data read by the speed data input means 25. The operating means 32 is to operate the motor 10 for one cycle in cooperation with the robot 11, according to the basic data. The pressure waveform processing means 33 is to set time series points when pressure change rate changes in the waveform of the detected pressure $P_d$ for one cycle output from the above pressure sensor 23. The basic data correction means 34 is to correct the basic data by time difference between the time series point about the workpiece speed change rate and the time series point about the above pressure change rate. The data switching means 35 is to store the data corrected by the basic data correction means 34 in the above basic data production means 31.

Figure 13:
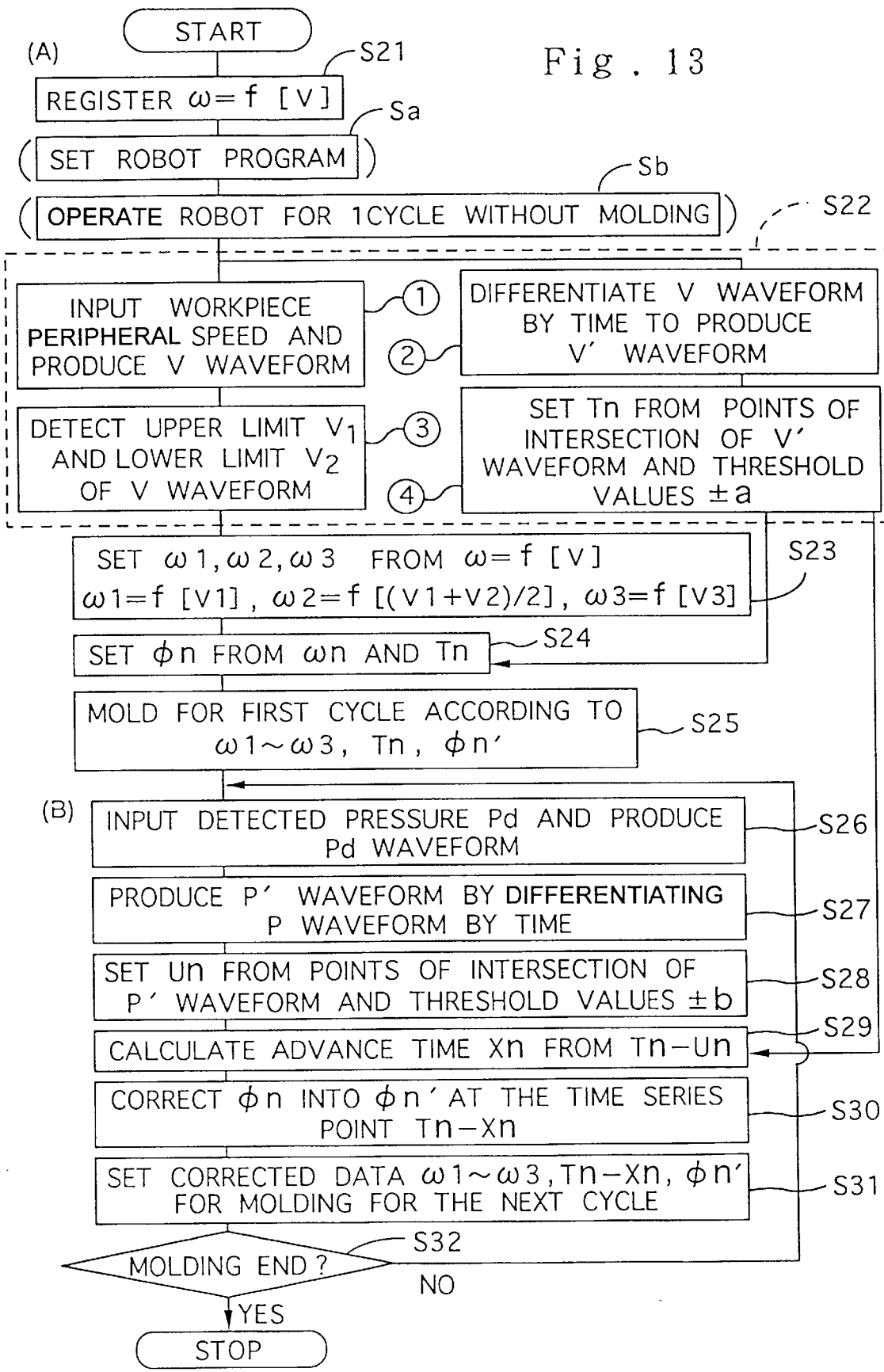
FIG. 13 is a flow chart showing programs carried out by the control apparatus of the third preferred embodiment of the present invention.
Figure 16:
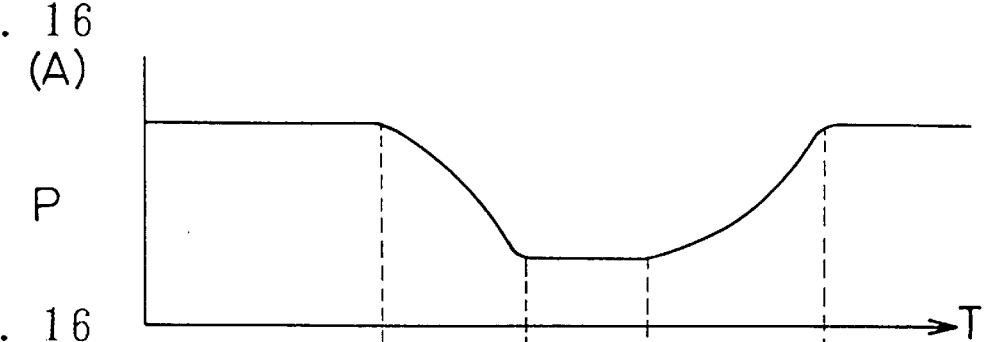
FIGS. 16(A), 16(B), 16(C), and 16(D) are also timing charts for explaining the programs carried out by the control apparatus of the third preferred embodiment of the present invention.
Figure 16:
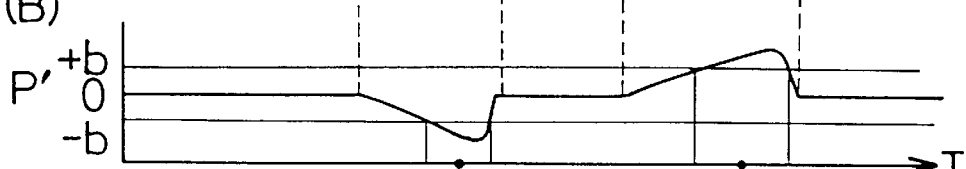
Figure 16:
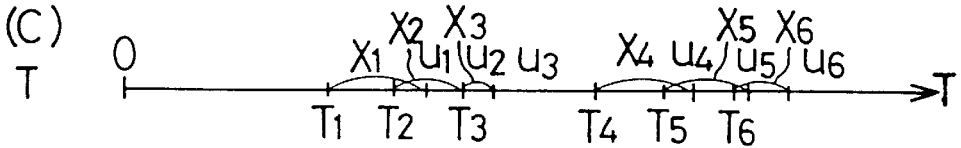
Figure 16:
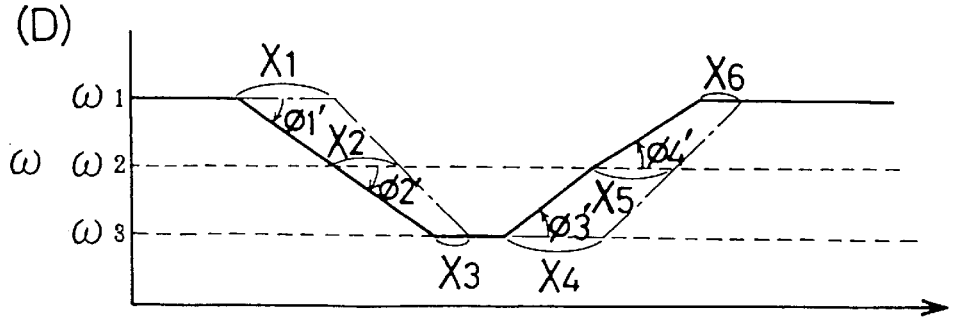
Figure 17:
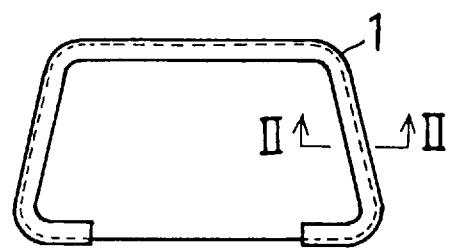
FIGS. 17(A) is a perspective view of a molding formed on a panel and produced by the present invention and FIG. 17(B) is a cross-sectional view taken along line II—II of FIG. 17(A)
Figure 17:
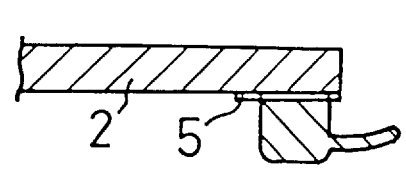

The control apparatus of the third preferred embodiment is operated as shown in FIG. 13.

In FIG. 13, Steps $S_{21}$ to $S_{25}$ (A) are preparatory processing before molding, and Steps $S_{26}$ to $S_{32}$ (B) are molding processing. Although in the third preferred embodiment a neuronet type control is exercised in which data are corrected while molding processing is conducted, this control is basically the same as that of the second preferred embodiment.

In Step $S_{21}$, the molding machine control panel 17 registers a regression formula ω=f[V] shown in FIG. 14 and expressing the relation between angular velocity ω of the motor 10 and workpiece peripheral speed V.

Steps $S_{22}$ to $S_{24}$ are to serve as the speed data input means 25 and the basic data production means 31. The molding machine control panel 17 reads workpiece peripheral speed V by the robot 11 operated for one cycle in Step $S_b$ (in Step 1), differentiates the read travel speed data (the waveform shown in FIG. 15(A)) by time to produce the waveform of workpiece travel speed change rate V' shown in FIG. 15(B) (in Step 2), determines an upper limit speed $V_1$ (rectilinear portion speed) and a lower limit speed $V_2$ (corner portion speed) from the above travel speed data (in Step 3), sets angular velocity $\omega_1$ to $\omega_3$ corresponding to the upper limit speed $V_1$, the lower limit speed $V_2$ and its average speed $(V_1+V_2)/2$ by using the above regression formula ω=f[V] (in Step $S_{23}$), and concurrently with Step $S_{23}$, sets time series points $T_1$ to $T_3$, $T_4$ to $T_6$ when the workpiece speed change rate V' changes, from points of intersection of each of a positive half cycle and a negative half cycle of the waveform of the above workpiece speed change rate V' and threshold values ±a (a: an arbitrary constant) (in Step 4).

After these preparatory processing, in Step $S_{24}$ the molding machine control panel 17 combines the above time series points $T_1$ to $T_3$, $T_4$ to $T_6$ with the data of the above angular velocity $\omega_1$ to $\omega_3$ and the angular velocity change rates $\phi_1$ to $\phi_3$, and $\phi_4$ to $\phi_6$ ($\phi_3$ and $\phi_6$ are 0), where $T_2=(T_1+T_3)/2$ $T_5=(T_4+T_6)/2$ $\phi_1=(T_2-T_1)/(\omega_2-\omega_1)$ $\phi_2=(T_3-T_2)/(\omega_3-\omega_2)$ $\phi_3=(T_5-T_4)/(\omega_2-\omega_3)$ $\phi_4=(T_6-T_5)/(\omega_1-\omega_2)$ Thus set are instruction speed and instruction speed change rate for one cycle which are required by the motor 10.

The data set composed of angular velocity $\omega_1$ to $\omega_3$, and angular velocity change rates $\phi_1$ to $\phi_3$, $\phi_4$ to $\phi_6$ is used for molding processing for the first cycle in Step $S_{25}$ to achieve molding of one workpiece.

Steps $S_{26}$, $S_{27}$ constitute pressure waveform processing means 33 which is a first step of molding of a second and other workpieces.

First, since detected pressure $P_d$ from the pressure sensor 23 has been input during the molding of the first workpiece, the waveform of the above detected pressure $P_d$ (see FIG. 16(A)) is produced in Step $S_{26}$.

In the following Step $S_{27}$, the the waveform of pressure change rate P' is produced by differentiating the waveform of the detected pressure $P_d$ by time (See FIG. 16(B)).

In Step $S_{28}$, in a similar way to the case with the angular velocity $\omega$, time series points $u_1$ to $u_3$, $u_4$ to $u_6$ are set by setting threshold values $\pm b$ (b: arbitrary constant) (see FIG. 16(B)).

These time series points $u_1$ to $u_3$, $U_4$ to $u_6$ ($u_n$) about the detected material extruding pressure Pd, and the time series points $T_1$ to $T_3$, $T_4$ to $T_6$ ($T_n$), set in Step $S_{22}$, about the angular velocity $\omega$, i.e., rotational speed of the motor 10 according to the data set for molding of the first workpiece respectively have time difference factors $X_1$ to $X_6$ ($X_n$). This relation is shown in FIG. 16(C). In FIG. 16(C), $X_1$ is a time difference between $u_1$ and $T_1$. $X_2$ is a time difference between $u_2$ and $T_2$, . . .

In Step $S_{29}$, the molding machine control panel 17 corrects the time series points $T_n$ by using the time difference $T_n - u_n$, that is to say, calculates time difference $X_n$ as advance time and then corrects the time series points $T_n$ into the time series points $T_n - X_n$ thereby serving as basic data correction means 34.

In Step $S_{30}$, the molding machine control panel 17 combines the corrected time series points $T_n - X_n$ with corrected angular velocity change rates $\phi_n'$, thereby serving as data switching means 35. The corrected angular velocity change rates $\phi_n'$ are obtained by correcting angular velocity change rates $\phi_n$ with the time difference $X_n$ as follows.

$$\begin{aligned}\phi_1' &= \{(T_2-X_2)-(T_1-X_1)\}/(w_2-w_1)\\ &= [\{(T_2-(u_2-T_2)\}-\{(T_1-(u_1-T_1)\}]/(w_2-w_1)\\ &= (2T_2-u_2-2T_1+u_1)/(w_2-w_1)\\ &= \{2(T_2-T_1)-(u_2-u_1)\}/(w_2-w_1)\end{aligned}$$

$\phi_2'=\{2(T_3-T_2)-(u_3-u_1)\}/(\omega_3-\omega_2)$ $\phi_3'=\{2(T_5-T_4)-(u_5-u_4)\}/(\omega_2-\omega_3)$ $\phi_4'=\{2(T_6-T_5)-(u_6-u_5)\}/(\omega_1-\omega_2)$ In Step $S_{31}$, molding is conducted according to the corrected data set. After molding, whether the molding is finished or not is determined in Step $S_{32}$, and when molding is finished with all workpieces, the program is finished.

In the above third preferred embodiment, because control signals are corrected by automatically compensating data with the time difference factor S during molding of each workpiece, the above third preferred embodiment has an advantage in that variations in the cross-sectional shape of moldings can be reduced even when there are disturbance such as change in temperature environment, and variations in resin material characteristic values.

As a modification of the third preferred embodiment, it is possible to obtain time series points $u_n$ about the pressure change rate by using a regression formula expressing the relation between material extruding pressure at the above nozzle fore end 4 and the above workpiece travel speed, instead of using the pressure detected by the pressure detecting means 23 for one cycle.

This invention may also be applied to production of molded products by extruding a material on the surface of a workpiece and taking off a molded product from the workpiece after molding. The application of the present invention achieves molding with speed capability of a robot on both the rectilinear portions and the corner curved portions of moldings.

Obviously, many modifications and variations of the present invention are possible in the light of the above teachings. It is therefore to be understood that within the scope of the appended claims, the invention may be practiced otherwise than as specifically described.

What is claimed is:

1. An extrusion molding apparatus comprising:

an extrusion molding machine having a nozzle fore end and a molding machine actuator for delivering an extrusion material through the nozzle fore end to become a frame-shaped molding, the molding machine actuator having an inoperative mode, an operative mode, and a working speed in the operative mode;

a robot for holding a workpiece on which said frame-shaped molding is formed while imparting to said workpiece complex motion including rectilinear motion and rotary motion, an operating speed of the robot being set to make travel speed of rectilinear portions of said workpiece relative to said nozzle fore end higher than travel speed of corner portions of said workpiece relative to said nozzle fore end; and a control apparatus comprising:

speed data input means for reading said workpiece travel speed relative to said nozzle fore end while said molding machine actuator is in the inoperative mode, and to provide a read workpiece travel speed;

difference factor calculating means for calculating at least one of a nonlinear difference factor and a time difference factor between material extruding pressure and working speed of said molding machine actuator based on said read workpiece travel speed, by using a regression formula expressing the relation of any two of said read workpiece travel speed, material extruding pressure at said nozzle fore end, and the working speed of said molding machine actuator; and operating means for controlling the working speed of said molding machine actuator in the operative mode by control signals generated to allow said material extruding pressure at said nozzle fore end to follow up changes in workpiece travel speed with said at least one of said nonlinear and time difference factors taken as a parameter.

2. The extrusion molding apparatus according to claim 1, wherein the control apparatus further comprises:

pressure detecting means for detecting material extruding pressure at said nozzle fore end while the molding machine actuator is in the operative mode;

said difference factor calculating means inputting detected pressure from said pressure detecting means, calculating necessary material extruding pressure at said nozzle fore end at each value of said read workpiece travel speed by using the regression formula to express the relation between said read workpiece travel speed and said material extruding pressure, and obtaining said nonlinear difference factor by comparing said calculated material extruding pressure with said detected pressure.

3. An extrusion molding apparatus comprising:

an extrusion molding machine having a nozzle fore end and a molding machine actuator for delivering through the nozzle fore end, an extrusion material to become a frame-shaped molding, the molding machine actuator having an inoperative mode, an operative mode, and a working speed in the operative mode;

a robot for holding a workpiece on which said frame-shaped molding is formed while imparting to said workpiece complex motion including rectilinear motion and rotary motion, an operating speed of the robot being set to make travel speed of rectilinear portions of said workpiece relative to said nozzle fore end higher than travel speed of corner portions of said workpiece relative to said nozzle fore end; and a control apparatus comprising:

pressure detecting means for detecting material extruding pressure at said nozzle fore end;

speed data input means for reading workpiece travel speed for one cycle of workpiece travel relative to said nozzle fore end while said molding machine actuator is in the inoperative mode, and to provide a read workpiece travel speed;

basic data production means for differentiating a waveform of changes in said read workpiece travel speed, setting time series points when said workpiece speed change rate changes, and setting instruction speed and instruction speed change rate as control signals for the working speed to said molding machine actuator at each of said time series points;

operating means for operating said molding machine actuator for another cycle in said operative mode in cooperation with said robot based on a data set composed of instruction speed and instruction speed change rate for the one cycle produced by said basic data production means at the respective time series points;

pressure waveform processing means for calculating pressure change rate from the wave form of detected pressure for the another cycle output from said pressure detecting means and setting time series points when said pressure change rate changes;

basic data correction means for calculating time difference between the time series points of said workpiece speed change rate and the time series points of said pressure change rate, and correcting said data set by said time difference; and data switching means for storing said data set corrected by said basic data correction means in said basic data production means as said control signals in order to conduct molding for a next cycle.

4. In an extrusion molding apparatus comprising:

an extrusion molding machine having a nozzle fore end and a molding machine actuator for delivering an extrusion material through said nozzle fore end to become a frame-shaped molding, the molding machine actuator having an inoperative mode, an operative mode, and a working speed in the operative mode;

a robot for holding a workpiece on which said frame-shaped molding is formed while imparting to said workpiece complex motion including rectilinear motion and rotary motion, an operating speed of the robot being set to make travel speed of rectilinear portions of said workpiece relative to said nozzle fore end higher than travel speed of corner portions of said workpiece relative to said nozzle fore end; and a control apparatus comprising:

speed data input means for reading workpiece travel speed for one cycle of workpiece travel relative to said nozzle fore end while said molding machine actuator is in the inoperative mode, and to provide a read workpiece travel speed;

basic data production means for producing basic data for developing said working speed of said molding machine actuator at each value of read workpiece travel speed by using a regression formula expressing the relation between said read workpiece travel speed and said working speed;

difference factor calculating means for calculating a workpiece travel speed change rate by differentiating the waveform of changes in the read workpiece travel speed for said one cycle of workpiece travel, and for calculating a time difference factor between a change in said working speed of said molding machine actuator and a change in material extruding pressure at said nozzle fore end, using the regression formula with said workpiece travel speed and said workpiece speed change rate taken as parameters; and operating means for correcting said basic data produced by said basic data production means along a time axis with said time difference factor calculated by said regression formula and producing a control signal.

* * * * *